UNITED STATES PATENT OFFICE.

JEAN NICOLAÏDI, OF PARIS, FRANCE.

OFFICINAL PREPARATION OF PHOSPHORIC ACID.

No. 914,175.  Specification of Letters Patent.  Patented March 2, 1909.

Application filed August 15, 1905. Serial No. 274,325.

*To all whom it may concern:*

Be it known that I, JEAN NICOLAÏDI, doctor of medicine, subject of the King of Greece, residing at Paris, Department of the Seine, France, and having post-office address 60 Rue de Miromesnil, in the said city, have invented certain new and useful Improvements in Manufacture and Production of an Officinal Preparation of Phosphoric Acid, of which the following is a specification.

This invention has for its object to produce an officinal preparation of free phosphoric acid in a solid, and granulated, state.

The use of free phosphoric acid is at present largely advocated for the treatment of certain diseases.

According to my invention I produce a preparation of phosphoric acid in a solid, and granulated, state, the whole of the said acid being in the free state. The various preparations containing phosphates do not answer the desired purpose as the phosphoric acid is combined with a base and constitutes a salt such, for instance, as calcium phosphate, sodium phosphate, and the like, and such salts are not suitable for use in the phosphoric acid treatment, they exerting an action on the patient differing entirely from that of free phosphoric acid.

It is essential that the product should be very stable whereas phosphoric acid itself is very hygroscopic and therefore liable to become soft and eventually to deliquesce.

According to my invention I provide a solid granular, and stable product containing phosphoric acid in a perfectly free state and not containing a trace of any matter capable of fixing, or chemically combining with, phosphoric acid and therefore the whole of the phosphoric acid in the product remains in the free state. The said product is rapidly and completely soluble in water, the solution containing the whole of the phosphoric acid in the free state. The said product moreover can be conveniently and accurately dosed and is suitable for use by delicate patients, who have difficulty in assimilating phosphoric acid taken alone.

The product can be prepared as follows: Take a substance which does not contain matter capable of chemically combining with phosphoric acid as milk-sugar and treat it with pure phosphoric acid. Then add gum arabic or an equivalent substance not containing matter capable of chemically combining with phosphoric acid so as to give the mixture sufficient consistency, and then from time to time a further quantity of the acid is added to render the mixture in proper condition for further treatment, as will now be explained. The paste thus obtained is then mixed and kneaded for some time (say a few hours) in a mill made of material which will not be attacked by, or injure, or form a chemical compound, with, phosphoric acid. If the mill were made for instance of iron, iron phosphates would be formed. The paste may be colored by maceration with any harmless substance capable of coloring it such for instance as Campeachy, or logwood.

The proportions of the several ingredients which give the best results are as follows: To 30 kilograms of milk sugar 4.050 kilograms of phosphoric acid are added and sufficient gum arabic to render the mass in a workable condition. The paste thus obtained is then granulated by means of a suitable apparatus which is also made of material which will not be attacked by, or injure, or form compounds with, phosphoric acid.

The granulated product is collected on frames and dried in a drying stove and then sifted and put into bottles, or other receptacles, after it has been ascertained by analysis that it contains the correct amount of free phosphoric acid.

Having thus described and ascertained the nature of my invention and in what manner the same may be performed, I declare that what I claim is:

The herein described process of obtaining an officinal preparation of phosphoric acid completely free of a basic salt or other substance, consisting in treating milk sugar with pure phosphoric acid, adding gum arabic to give the mixture suitable consistency, thoroughly kneading this product and adding further quantities of the pure phosphori cacid to keep the mass moist and to insure thorough permeation of the mass by the acid, and finally drying and granulating the product.

In testimony whereof I have hereunto set my hand in presence of two subscribing witnesses.

JEAN NICOLAÏDI.

Witnesses:
 EMILE KLOTZ,
 MAX DE RIVAUD.